United States Patent [19]
Olsson et al.

[11] Patent Number: 5,473,649
[45] Date of Patent: Dec. 5, 1995

[54] FUEL ELEMENT FOR A LIGHT-WATER NUCLEAR REACTOR

[75] Inventors: Torsten Olsson, Västerås; Anders Söderlund, Surahammar, both of Sweden

[73] Assignee: ABB Atom AB, Västerås, Sweden

[21] Appl. No.: 65,748

[22] Filed: May 12, 1993

[30] Foreign Application Priority Data

May 22, 1992 [SE] Sweden ................................. 9201639

[51] Int. Cl.⁶ .............................. G21C 19/30; G21C 3/04
[52] U.S. Cl. ...................... 376/313; 376/352; 376/443; 376/446
[58] Field of Search .................... 376/352, 313, 376/443, 446

[56] References Cited

U.S. PATENT DOCUMENTS

| | | | |
|---|---|---|---|
| 5,030,412 | 7/1991 | Yates et al. | 376/352 |
| 5,066,453 | 11/1991 | Heppenstall et al. | 376/352 |
| 5,135,710 | 8/1992 | Graffier et al. | 376/352 |
| 5,180,545 | 1/1993 | Graffier | 376/352 |
| 5,219,517 | 6/1993 | Nylund | 376/352 |
| 5,225,152 | 7/1993 | Verdier | 376/352 |
| 5,230,861 | 7/1993 | Nylund | 376/352 |
| 5,282,231 | 1/1994 | Adams et al. | 376/352 |

FOREIGN PATENT DOCUMENTS 465644  10/1991  Sweden ................................. 376/313

*Primary Examiner*—Behrend E. Harvey
*Attorney, Agent, or Firm*—Watson, Cole, Grindle & Watson

[57] ABSTRACT

A fuel assembly for a light-water nuclear reactor includes a plurality of vertical fuel rods (10) which are arranged, in spaced relationship in the lateral direction, between a bottom tie plate (11) and a top tie plate (12). The bottom tie plate and the top tie plate are provided with through-holes (35) for inlet and outlet of coolant for the fuel rods. Below the bottom tie plate, in the flow path of the water, a debris catcher (36) is arranged which includes helical springs (40) that are arranged in a frame having at least two ends (37, 38) in the form of substantially parallel plates, the flat sides of which are interconnected via pins (39). The pins are arranged in spaced relationship in at least two rows between the ends in such a way that the springs, in spaced relationship or adjacent to each other, can be fixed between the rows of pins in one or more layers.

4 Claims, 4 Drawing Sheets

FUEL ELEMENT FOR A LIGHT-WATER NUCLEAR REACTOR

TECHNICAL FIELD

The present invention relates to a fuel assembly for a nuclear reactor of light-water type, comprising a plurality of vertical fuel rods which are arranged, in spaced relationship, between a bottom tie plate and a top tie plate which are both provided with through-holes for inlet and outlet and for conducting coolant to the fuel rods.

BACKGROUND ART, PROBLEMS

Experience shows that, for example in connection with repairs and service of a nuclear reactor, debris may enter and then move with the water which circulates through the reactor core. The debris may, inter alia, consist of metal shavings (borings or turnings) formed in connection with the repair of, for example, a steam separator, pieces of metal wire, or other foreign particles, which have entered the system from the outside. The debris may give rise to abrasion damage, which may have serious consequences if they occur on parts which are particularly easily damaged, such as fuel rods. This may be the case if the debris adheres to a spacer.

To avoid damage of the above-mentioned kind in pressurized-water reactors, it is known to form the bottom tie plates, already existing under fuel rod bundles, with a large number of bored holes in order for each bottom tie plate, besides its normal function, to function as a debris catcher in the form of a strainer and prevent debris from reaching the fuel rod bundle with control rod guide tubes and spacers.

A type of bottom tie plate which is also intended to serve as a debris catcher is described in Swedish patent application 9100402-8. This bottom tie plate is provided with horizontal channels which cross vertical flow channels, and in at least some of the horizontal channels spiral springs with horizontal symmetry axis are arranged. The disadvantage of this solution is that it is difficult to avoid that the flow resistance across the bottom tie plate becomes too high.

A type of separate debris catcher arranged below the bottom tie plate is described in Swedish patent 465 644. This debris catcher comprises several turns of a wound tape or several concentric rings with spacing elements arranged between the turns of the tape or the rings, which spacing elements maintain a mutual distance between the turns of the tape or the rings in the radial direction. The problem with hitherto known separate debris catchers is that they provide a impermissibly high flow resistance and/or are complicated and expensive to manufacture.

SUMMARY OF THE INVENTION, ADVANTAGES

According to the present invention, a debris catcher is arranged as a separate unit below or above the bottom tie plate and spaced from this plate in the flow path of the water through a bundle of rods. The debris-catching elements of the debris catcher consist of springs, preferably helical springs. The use of helical springs as debris-catching elements allows an area reduction which is small in cross section and hence a moderate speed variation of the coolant flow when passing through the debris filter.

A frame comprising two ends and a number of pins keep the springs in position. The ends consist of substantially parallel plates, the flat sides of which are interconnected via the pins. The pins are arranged spaced from each other in at least two rows between the ends in such a way that a plurality of parallel springs in spaced relationship or adjacent to each other can be fixed between the rows of pins in one or more layers.

The debris catcher is normally arranged at least substantially such that the symmetry axis of the springs is horizontal. In a boiling-water reactor, the debris catcher can be arranged spaced from the bottom tie plate.

In at least certain types of pressurized-water reactors, it may be necessary to allow the debris catcher to make contact with the underside of the bottom tie plate or to arrange it at a very small distance from the underside.

By designing the debris catcher in the manner described above, it may be given a very low flow resistance and hence constitute a minimal obstacle to the desired flow while at the same time the pins with intermediate springs are active during the debris catching.

To compensate for the pressure drop which the debris catcher still causes, the flow holes in the bottom tie plate may be made somewhat larger.

One advantage with the invention is that the debris catcher can be inserted into fuel assemblies without necessitating any major modifications and without significantly influencing the flow resistance.

Another advantage in the mentioned case is that it is possible, in a simple manner, to supplement already existing fuel designs with debris catchers.

A debris catcher according to the invention is very simple to manufacture and very robust since it can be designed with few parts. This also means that the risk of small parts becoming detached in connection with the water flowing through is very small.

BRIEF DESCRIPTION OF THE DRAWINGS

The invention will be explained in greater detail by describing an embodiment with reference to the accompanying drawings, wherein.

DESCRIPTION OF THE PREFERRED EMBODIMENTS

Figure 1:
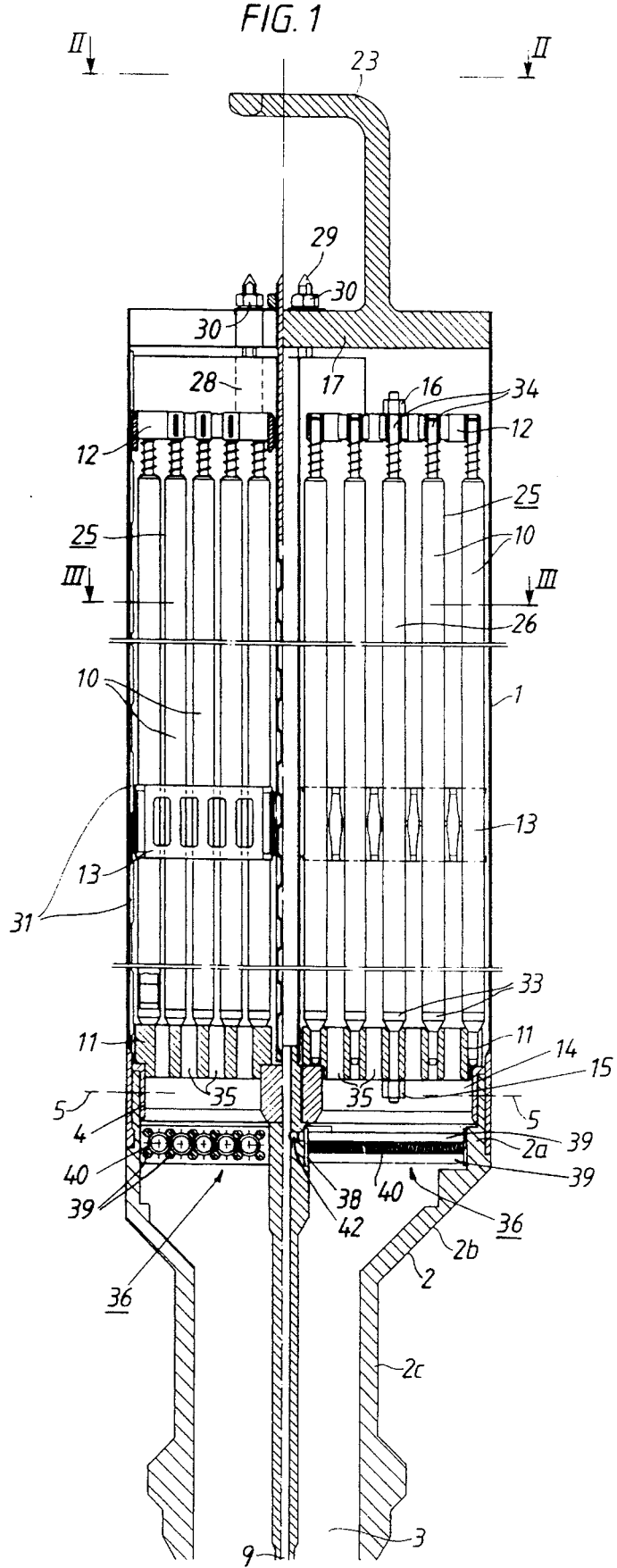
FIG. 1 shows, in a vertical section through the line I—I in FIG. 2, an embodiment of a composed fuel assembly composed of four rod bundles for a boiling-water reactor according to the invention with a debris catcher arranged below the bottom tie plate on each fuel assembly.
Figure 2:
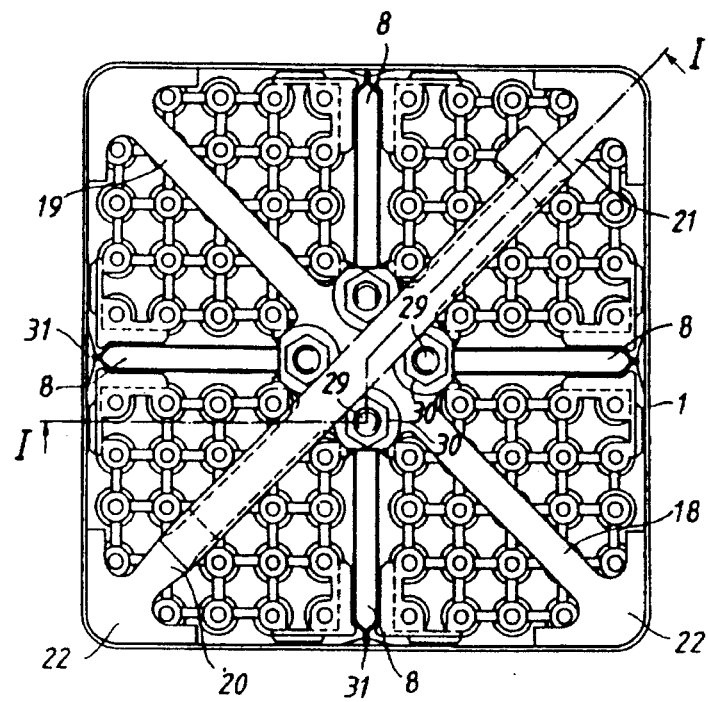
FIG. 2 shows the same fuel assembly in a view perpendicular to a horizontal plane through the line II—II in FIG. 1.
Figure 3:
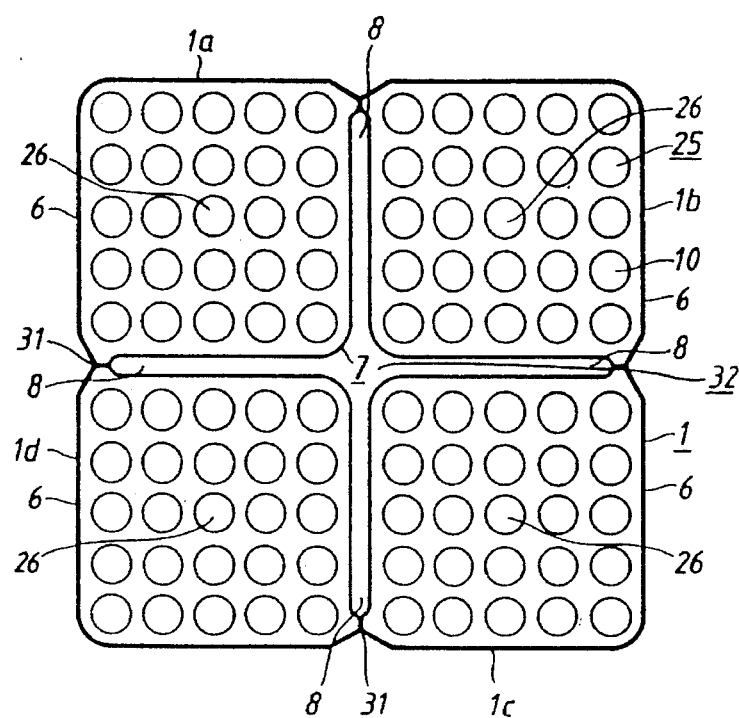
FIG. 3 shows a horizontal section through the line III—III in FIG. 1.

FIGS. 1–4 show a fuel channel 1 of substantially square cross section. The fuel channel 1 surrounds, with no significant free space, an upper square portion 2a of a bottom part 2 which otherwise comprises a conical portion 2b and a cylindrical portion 2c. The bottom part 2 has a downwardly-facing inlet opening 3 for cooling water. Besides supporting the fuel channel 1, the bottom part 2 supports a supporting plate 4. At its lowermost part, the fuel channel 1 has a relatively thick wall portion which is fixed to the bottom part 2 and the supporting plate 4 by means of a plurality of horizontal bolts, indicated by dash-dotted lines 5.

By means of a hollow supporting member 7 with cruciform cross section, the fuel channel 1 is divided into four vertical tubular parts 6 with at least substantially square cross section. The supporting member 7 is welded to the four walls 1a, 1b, 1c and 1d of the fuel channel 1 and has four hollow wings 8. The central channel formed by the supporting member 7 is designated 32 and is connected at the bottom to an inlet tube 9 for moderator water. Each tubular part 6 comprises a bundle 25 of twenty-five fuel rods 10. The rods 10 are arranged in a symmetrical lattice in five rows each containing five rods 10. Each rod 10 is included in two rows perpendicular to each other.

Each bundle 25 is arranged with a bottom tie plate 11, a top tie plate 12 and a plurality of spacers 13. A fuel rod bundle 25 with bottom tie plate 11, top tie plate 12, spacer 13 and fuel channel 1 forms a unit which, in this application, is referred to as a sub-assembly, whereas the device illustrated in FIGS. 1–4 and comprising four such sub-assemblies is referred to as a fuel assembly.

The four bottom tie plates 11 are supported in the fuel assembly by the supporting plate 4 and are each partially inserted into a corresponding square hole 14 therein. In each sub-assembly at least one of the fuel rods 10 is made with relatively long, threaded end plugs 33 and 34 of solid cladding material, the lower end plug 33 being passed through the bottom tie plate 11 and provided with a nut 15, the upper end plug 34 being passed through the top tie plate 12 and provided with a nut 16. In the embodiment shown the centre rod in each sub-assembly is formed in this way. This rod also serves as a spacer holder rod.

The holes for the passage of the water through the bottom tie plate 11 are designated 35. An upper end portion of the fuel channel 1 surrounds a cruciform lifting plate 17 with four horizontal arms 18, 19, 20 and 21, which emanate from a common central portion. At its outer end each arm 18–21 has an arrow-head-like portion 22, each of which makes contact with the inner wall surface of the fuel channel 1 at respective corners of the fuel channel 1. A lifting handle 23 is fixed to the arms 18–21. The lifting plate 17 and the handle 23 together form a lifting member of steel cast in one piece. The lifting plate 17 is fixed to the supporting member 7 by inserting each of four vertical bars 28 into a respective wing 8 of the supporting member 7 and welding them thereto. At the top each bar 28 has a vertical, bolt-like portion 29 which is passed, with a free space, through a corresponding hole in the central portion of the lifting plate 17 and provided with a nut 30. As will be clear from the figures, the fuel channel 1 is provided with indentations 31, arranged intermittently in the longitudinal direction, to which the supporting member 7 is welded.

Figure 4:
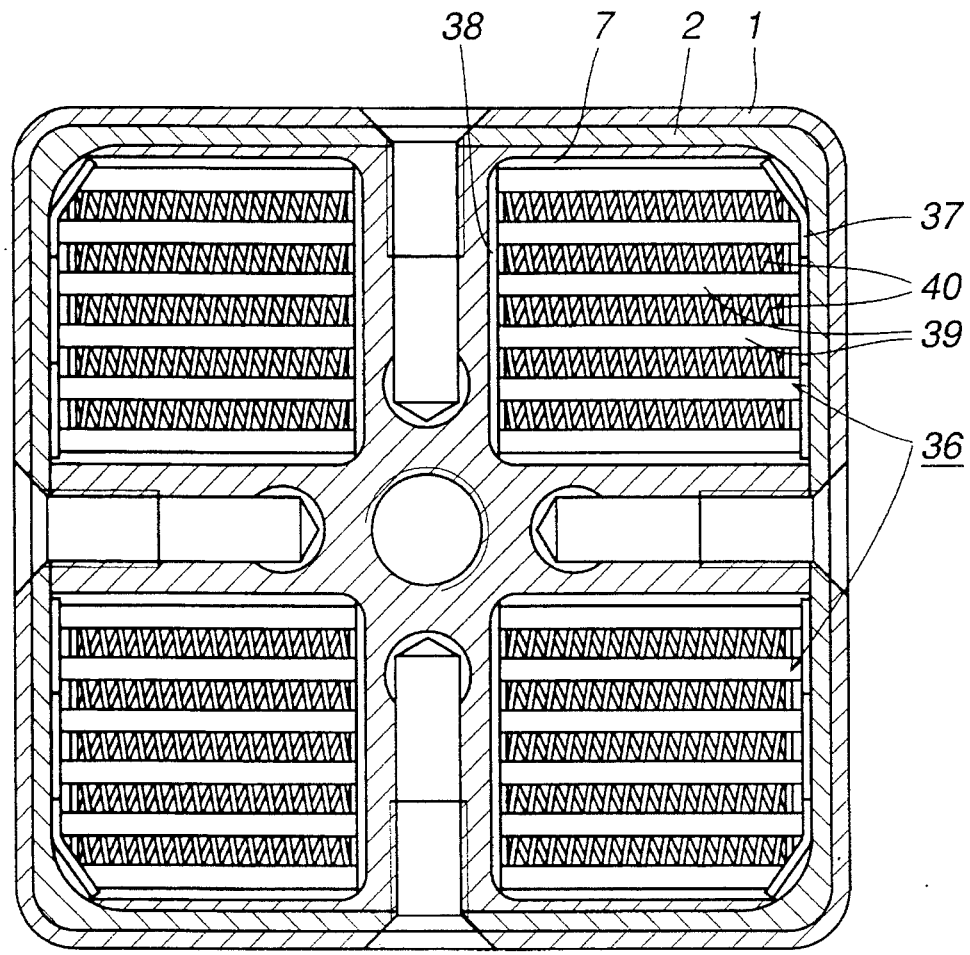
FIG. 4 shows a view from above of four debris catchers according to FIG. 1 arranged in the bottom part of a fuel assembly.
Figures 5, 6:
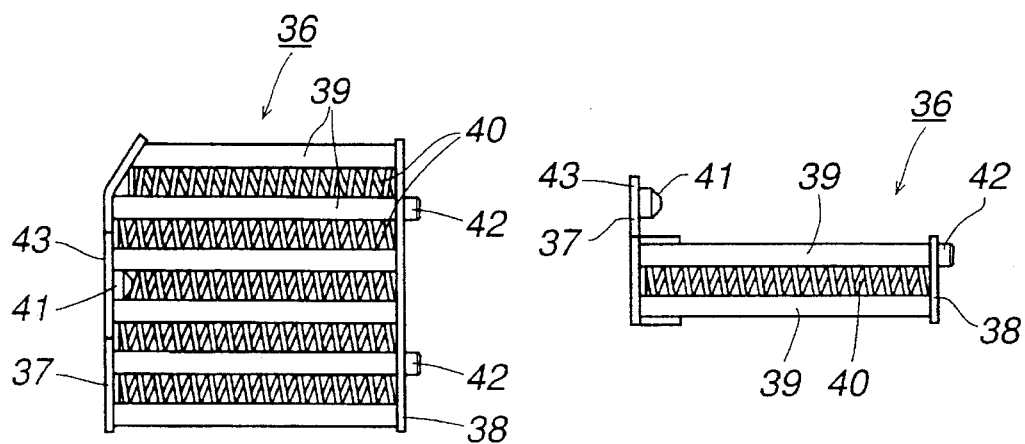
FIG. 5 shows a debris catcher according to FIG. 1 in a view from above.
FIG. 6 shows a debris catcher according to FIG. 1 in a view from the side.
Figure 7A:
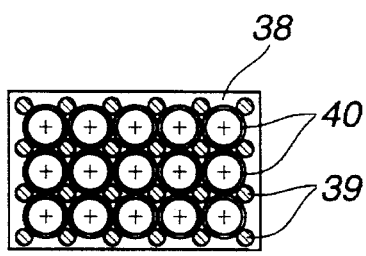
FIGS. 7a and 7b show a debris catcher of the invention wherein the helical springs are positioned adjacent one another and in a plurality of layers, FIG. 7a being a view along line VII—VII of FIG. 7b.
Figure 7B:
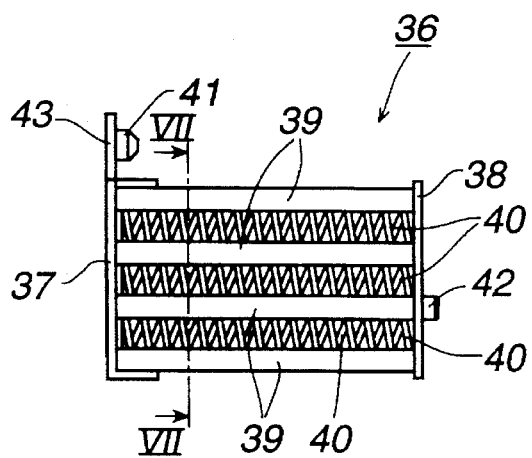
Figure 8:
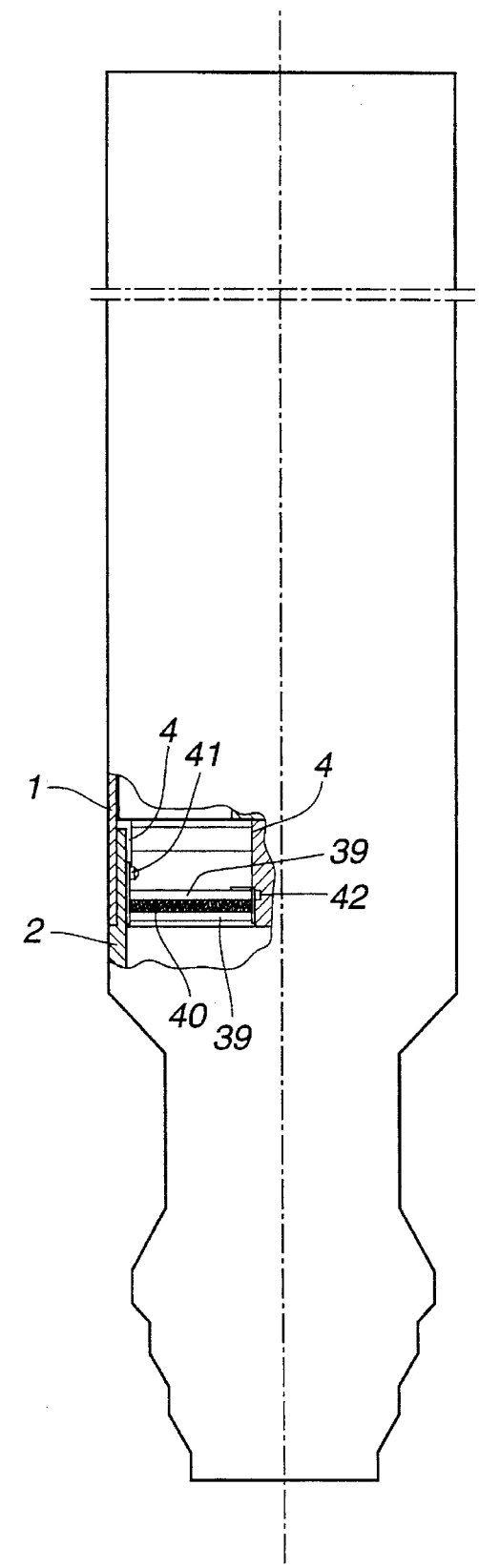
FIG. 8 shows an external side view of a fuel assembly for a boiling water reactor with a portion broken away to show the connection of the debris catcher of the invention to the support plate of the fuel assembly.

According to the present invention, the debris catcher 36 is arranged below the bottom tie plates 11 in the bottom part 2, that is, in the flow path for the water which flows to each one of the bottom tie plates 11. The debris catcher 36 is best illustrated in FIGS. 4–6. Four debris catchers of the type shown in FIG. 5 are arranged in a fuel assembly according to FIG. 4.

In FIGS. 1, 4, 5 and 6 each debris catcher comprises two ends 37, 38 in the form of substantially parallel plates. The flat sides of the ends 37, 38 are interconnected via pins 39. The pins 39 are arranged in spaced relationship in two rows between the ends 37, 38 in such a way that a plurality of parallel springs in the form of helical springs 40 in spaced relationship to each other or placed adjacent to each other can be fixed between the two rows of pins 39. One of the ends 37 is provided with a peg 41 and the other end 39 with two pegs 42, these pegs allowing the debris catcher to be fixed to the bottom part 2. The two pegs 42 can suitably consist of extended pins 39. One of the ends 37 can also be provided with a flange 43 which can be welded to the bottom part 2 for additional fixing of the debris catcher 36.

The shape of the bottom part 2 necessitates bending of one of the ends 37 to accomodate this. Alternatively, the whole debris catcher 36 can be made shorter, that is, the length of all the pins 39 and the springs 40 be shortened, but in that case the debris-catching area is reduced.

The material in the ends 37, 38 and the pins 39 consists, for example, of stainless steel or of any other material which is corrosion-resistant to the reactor water. The material in the springs 40 preferably consists of inconel. The pitch of the helical springs 40 is determined by the demands on the debris-catching capacity. The helical springs 40 are manufactured with tolerances which prevent the occurrence of a free space between the springs 40 and the pins 39, which eliminates the risk of abrasion because of vibrations.

To compensate for the pressure drop which arises across the debris catcher 36, the diameter of the flow holes 35 in the bottom tie plate 11 may be increased somewhat.

According to a particularly preferred embodiment of the invention, the debris catcher 36 consists of a device parallel to the bottom tie plate 11 in such a way that the symmetry axis of the helical springs 40 is horizontal. If the debris catcher 36 is arranged below the bottom tie plate 11, it has, in addition to the advantages mentioned above, the advantage of being able to be inspected and cleaned.

It is obvious that a debris catcher 36 of the kind described can be used in a fuel assembly which is not, as in the exemplified case, divided into sub-assemblies with their own bottom tie plates 11 but which consists of one single assembly with one single bottom tie plate and is thus in analogous manner placed in the flow path of the water to the single bottom tie plate.

It is also obvious that a debris catcher 36 of the kind described can be arranged below the bottom tie plate of a pressurized-water reactor. In a pressurized-water reactor, because of the constructive design of the flow path of the water to the bottom tie plate, it is normally most suitable to allow the debris catcher 36 to make contact with the underside of the bottom tie plate.

We claim:

1. A fuel assembly for a light-water nuclear reactor which can be mounted on a bottom part through which coolant flows, said fuel assembly comprising a bottom tie plate which has holes therethrough for the passage of coolant, a top tie plate which has holes therethrough for the passage of coolant, a plurality of vertical fuel rods mounted in spaced fashion between said bottom tie plate and said top tie plate, and a debris catcher means located beneath said bottom tie plate and positioned within said bottom part, said debris catcher comprising two substantially vertical end plates having facing flat sides, a plurality of horizontally-extending pins which extend between said end plates in at least two vertically spaced rows, and a plurality of horizontally-extending helical springs which extend in parallel with one another and between said end plates, wherein a spacing between adjacent pins in both a vertical and a horizontal direction is less than a diameter of a helical spring therebetween so as to maintain said helical springs in position.

2. A fuel assembly according to claim 1, wherein said helical springs are positioned by said pins to be in spaced relation to one another.

3. A fuel assembly according to claim 1, wherein said helical springs are positioned by said pins to be adjacent one another.

4. A fuel assembly according to claim 1, wherein said debris catcher means is spaced from said bottom tie plate.

* * * * *